United States Patent
Anwar

(10) Patent No.: US 9,363,708 B2
(45) Date of Patent: Jun. 7, 2016

(54) NEUTRAL HOST WIRELESS LOCAL AREA NETWORK APPARATUS AND METHOD AND/OR DATA OFFLOADING ARCHITECTURE APPARATUS AND METHOD

(71) Applicant: REACH HOLDINGS LLC, Winston, OR (US)

(72) Inventor: Saeed Anwar, Spokane, WA (US)

(73) Assignee: Reach Holdings LLC, Winston, OR (US)

( * ) Notice: Subject to any disclaimer, the term of this patent is extended or adjusted under 35 U.S.C. 154(b) by 0 days.

(21) Appl. No.: 14/189,861

(22) Filed: Feb. 25, 2014

(65) Prior Publication Data

US 2014/0348062 A1 Nov. 27, 2014

Related U.S. Application Data

(60) Provisional application No. 61/769,089, filed on Feb. 25, 2013.

(51) Int. Cl.
*H04W 4/00* (2009.01)
*H04W 28/08* (2009.01)

(52) U.S. Cl.
CPC .................................. *H04W 28/08* (2013.01)

(58) Field of Classification Search
None
See application file for complete search history.

(56) References Cited

U.S. PATENT DOCUMENTS

| | | | |
|---|---|---|---|
| 8,315,266 B1 * | 11/2012 | Lam et al. | 370/401 |
| 2014/0086571 A1 * | 3/2014 | Fong et al. | 398/2 |
| 2014/0369688 A1 * | 12/2014 | Jain | 398/66 |
| 2015/0010307 A1 * | 1/2015 | Zhong et al. | 398/68 |

* cited by examiner

*Primary Examiner* — Frank Duong
(74) *Attorney, Agent, or Firm* — Matthew A. Pequignot; Pequignot + Myers LLC

(57) ABSTRACT

Network architectures, apparatus, methods, and processes related to WiFi enabled devices (e.g., tablets and cellular phones) and wireless local area networks. In certain non-limiting embodiments, network architectures, apparatus, methods, and processes for providing or handling data offloading from congested cellular networks. In other non-limiting embodiments, network architectures, apparatus, methods, and processes pertaining to shared WiFi networks and/or infrastructures.

15 Claims, 7 Drawing Sheets

NEUTRAL HOST WIRELESS LOCAL AREA NETWORK APPARATUS AND METHOD AND/OR DATA OFFLOADING ARCHITECTURE APPARATUS AND METHOD

RELATED APPLICATION DATA

This application claims priority to U.S. patent application Ser. No. 61/769,089, filed Feb. 25, 2013, entitled NEUTRAL HOST WIRELESS LOCAL AREA NETWORK APPARATUS AND METHOD AND/OR DATA OFFLOADING ARCHITECTURE APPARATUS AND METHOD, the entirety of which is hereby incorporated by reference.

FIELD OF INVENTION

This invention relates to network architectures, apparatus, methods, and processes involving WiFi enabled devices (e.g., tablets and cellular phones) and wireless local area networks. In certain non-limiting embodiments, this invention relates to network architectures, apparatus, methods, and processes for providing or handling data offloading from congested cellular networks. In other non-limiting embodiments, this invention relates to shared WiFi networks and/or infrastructures, including methods and processes affiliated therewith.

BACKGROUND OF THE INVENTION

Local area networks that utilize high frequency radio signals to transmit and receive data are commonly referred to as WiFi networks (or simply "WiFi"). WiFi is a popular technology, now ubiquitous in most developed regions around the world, that allows enabled electronic devices, such as smartphones, tablets, or computers, to exchange data wirelessly over a network connected to the internet or World Wide Web.

A WiFi enabled device, such as a personal computer, video-game console, smart phone, tablet, or digital audio player, can connect to a data network, such as the internet, via one or more wireless network access points. Since wireless access points (often termed "hotspots") typically have a limited range (e.g., 50 feet), one technique to provide extended WiFi access coverage involves the utilization or deployment of multiple wireless access points having overlapping ranges. Using such a technique, wireless network accessibility can be provided generally uniformly on a large scale, such as at a sports stadium or in an airport.

Cellular or mobile data offloading is the use of alternate, compatible network technologies for delivering (e.g., sending or receiving) data to or from an enabled mobile device via a network other than the cellular network of the cellular service provider. That is, when certain conditions are present, data originally targeted for a cellular network (e.g., the network of the provider of cellular phone service) may be "offloaded" onto an alternate or complementary network.

By way of example, when large numbers of mobile device users converge at an event such as a professional football game at a stadium (or a concert), the available local capacity of a cellular network can be easily exceeded. This problem has become increasingly more prevalent, particularly since the advent and rising use of tablets and smartphones which often include high bandwidth applications.

When the capacity of a cellular network is approached or exceeded, mobile device performance suffers (e.g., with possible outages and slow response times) which is undesirable for the device user and harmful to the reputation of the cellular provider. Data offloading solutions have been used in the past to address these network traffic capacity issues. These prior known solutions shift data traffic off of the cellular data network and onto an alternate data network, such as a WiFi network described above. Of course, data offloading is also useful to mobile device users wishing to limit cellular data usage such as if the user's cellular service contract does not allow for "unlimited" data usage at a set, contracted price.

Although certain data offloading solutions were heretofore known, such prior art offloading solutions suffer one or more drawbacks. For example, in certain offloading scenarios, when a mobile device initiates a data offload attempt, the transition to an alternate data network is often not "seamless" and is therefore undesirable. For example, a third party WiFi provider may provide an offload opportunity to a mobile device user, but the third party provider often implements software download requirements, requires new user identifications or passwords to be created, requires additional payment (e.g., not shared with the cellular provider), and/or wrests control of data security (e.g., encryption) from the cellular service provider. Furthermore, at large events at stadiums (for example), where upwards of 100,000 people might be in attendance, a conventional WiFi hotspot will not provide sufficient offload bandwidth capacity. Moreover, such hotspots are not readily and affordably scalable.

In view of the above drawbacks, it would be desirable in the art to provide improved wireless local access networks which are more affordably and/or easily scalable to accommodate high data traffic volume. It would also be desirable to provide such networks for use to accept cellular data offload traffic, particularly at high attendance events such as concerts and sporting venues. It would similarly be desirable to provide data offloading networks and/or architecture (e.g., unique WiFi network architectures) which may be "shared" among multiple cellular or mobile device service providers. Still furthermore, it would be desirable to provide networks at high capacity venues (e.g., a football stadium) which provide a new source of revenue to one or more of the venue owner and/or one or more mobile service providers (or another entity). It would be further desirable to provide access to a data offloading network, or to provide a network architecture which provides data offloading functionality, which provides, or at least permits, a relative "seamless" transition of the connection of a mobile device from a cellular network to an "offload" network (e.g., a WiFi network).

In view of these and other desires for improvements in the art, it is a purpose of the herein described inventions to address one or more of such desires as well as, or in the alternative, other needs which will become more apparent to the skilled artisan once given the present disclosure.

SUMMARY OF CERTAIN EXAMPLES OF THE INVENTION

For the purpose of this application and/or patent, various terms are used herein which are either new or which are intended to have particular meanings or definitions. These meanings or definitions, provided below, may differ from, and are intended to replace, ordinary dictionary meanings or conventional technological standards (e.g., which may be narrower).

DEFINITIONS

"WiFi" is hereby defined to refer to one or more local area networks (or network related products) that provide or allow for wireless transmissions or exchanges of data. The term "WiFi", as used herein, is not limited to networks or products that are based on or conform to Institute of Electrical and Electronics Engineers (IEEE) 802.11 standards, but can include any wireless local area network ("WLAN"). An example "WiFi" network employs high frequency radio signals that allow enabled electronic devices, such as smartphones, tablets, or computers, to exchange data wirelessly.

"Neutral Host" is hereby defined to refer to a WiFi (or other data network) infrastructure (e.g., at a high capacity venue) that is shareable amongst multiple service providers who wish to provide WiFi or other data access to their customers. The term "neutral", in this context, is used to indicate that the network architecture is designed or structured to be compatible with a plurality of different mobile network operators, or with other providers of data streams.

"Venue" is hereby defined to refer to an establishment or gathering place (whether public or private and regardless of whether defined by physical barriers or walls) where end-customers arrive or gather to participate in an event. Non-limiting examples of events include sports contests, concerts, conventions, tradeshows, and speeches. Non-limiting examples of venues include stadiums, sports' fields, airports, subways, conventional halls, public squares, and fair grounds.

"Mobile Network Operator" or "MNO" is hereby defined as an operator (or owner) of a mobile or cellular data or phone network. Examples of existing MNOs are AT&T, Verizon Wireless, Sprint, and T-Mobile.

"Carrier" is used herein with the same general meaning as "Mobile Network Operator" or "MNO".

"ISP" is intended to retain its ordinary definition as an abbreviation for the term "internet service provider". Examples of existing internet service provider companies are Comcast, Boingo, and Cox.

"ONT" is intended to retain its ordinary definition as an abbreviation for the term "optical network terminal". An example of an "ONT" is a device or product which allows fiber-optic data transmissions (e.g., sent as light) to be transferred (or converted for transmission) to electrical wires (e.g., copper wires) or vice-versa. Data may include, but is not limited to, telephone data, internet data, or video data.

"OLT" is intended to retain its ordinary definition as an abbreviation for the term "optical line termination" or "optical line terminal". An example of an "OLT" is a device or product which serves as an MNO end point of a passive optical network. An OLT may, for example, perform conversion back and forth of electrical signals used by the MNO's equipment and the optical or light signals used by the passive optical network.

Summary of Certain Non-Limiting Examples:

Generally speaking, this invention provides network architectures, apparatus, methods, and processes related to WiFi enabled devices (e.g., tablets and cellular phones) and wireless local area networks. In some example embodiments, this invention provides network architectures, apparatus, methods, and processes for data offloading (e.g., from congested cellular networks). In other example embodiments, this invention provides unique, shared WiFi networks and/or infrastructures which are more easily and/or cost effectively scalable. In still other embodiments, this invention provides WiFi offload networks, usable at high capacity venues, which are capable of providing new revenue streams and/or divided revenue streams. In still further example embodiments, this invention provides relative "seamless" network transitions during cellular data offload transactions.

In at least one embodiment, there is provided a network architecture for providing a neutral host Wi-Fi platform. One example of such an architecture includes a plurality of wireless access points communicably connected to a plurality of ONTs, a dense wavelength division multiplexing ("DWDM") passive optical network comprised of optical fiber, a power (e.g., AC power) distribution infrastructure to provide power to the ONT and access points, a controller-less smart signalling switch router that allows direct connection to internet service providers (e.g., which may be mobile network operators) such as AT&T, Sprint and Verizon Wireless (a controller for the access points may optionally be used), and at least one venue service set identifier ("SSID").

In some embodiments employing the above architecture (or employing other architectures described below or depicted in the drawings), a single SSID may be employed which is uniquely created to have a "name" corresponding to or associated with a specific event. For example, the SSID "myNFL" could be employed when such a network is used or installed at a football game. In certain preferred (but non-limiting) embodiments, a single SSID may be used by a plurality of mobile device owners regardless of their service carrier (e.g., regardless of which MNO their mobile device is contracted with). That is, a single SSID may be used as the single "gateway" for two (or more) separate mobile device users, contracted with two (or more) different MNOs, to connect to specific offload networks "controlled" by their respective contracted MNO. It is, of course, preferable that in some (but not all) embodiments that the connection to such networks is relatively "seamless" in that the end device user is not required to execute any additional steps to connect to such a network beyond those which are ordinarily required by (or at least desired by) its contracted MNO. In other words, the MNO may retain control of connectivity steps, data or connectivity security (such as encryption), and/or the appearance and/or speed of the connection.

In another embodiment there is provided a neutral host network, including a plurality of subscribers periodically or continuously wirelessly connected to the network (who consume bi-directional bandwidth e.g., internet based data such as email or streaming audio or video), where the bi-directional bandwidth which is provided to each WiFi enabled device (e.g., a 3G or 4G handset) is only provided by the specific MNO to which the particular WiFi enabled device user normally subscribes. That is, even though multiple MNOs may be inserting data streams into the neutral host network, a WiFi enabled device user will only connect, in this example network design, to the data stream provided by his/her contracted MNO. In preferred embodiments, WiFi enabled device users are communicably, wirelessly connected to the neutral host network directly, without being connected through or to a 'middle man' ISP. In certain other preferred embodiments, a neutral host network is provided which is built or maintained by a venue owner (or an entity that controls or operates the venue) but where a plurality of MNOs are independently connected to the neutral host network to both insert data and receive data separately from one another. In such an embodiment, the neutral host network architecture permits MNOs to link to and exchange data only with their subscribers. This is possible even though multiple MNOs are connected to the neutral host network, and even though WiFi enabled devices subscribed to different MNOs are also wirelessly connected to the neutral host network. In these or other embodiments of networks describe herein, security measures are optionally (but preferably) employed to protect data traffic. For example, an internet protocol security (IPsec) tunnel may be implemented and used in conjunction with such networks.

In yet another embodiment there is provided a neutral host network which, as a result of its architecture, is capable of being managed and/or leveraged uniquely for a variety of manners and purposes. As one example, network architecture construction, expansion, maintenance, and/or costs may be shared among MNOs (in other examples, it may be owned by the venue owner). Such sharing may be divided or apportioned according to actual data usage attributable to a respective MNO. Not only does this potentially reduce or eliminate costs to a venue owner (related to the network), but it also, if utilized, can help ensure that service level agreement ("SLA") quality may be maintained on an affordable, or at least commercially reasonable, basis. In other or related embodiments, a venue owner may optionally derive revenue from use of the network by subscribers of the member MNOs. In certain of such embodiments, because the network architecture allows for monitoring of data usage by particular MNOs (or their subscribers), monetary payments (or other calculations) can be tied to specific MNO data usage (e.g., the MNO, in some example implementations, will pay the venue owner for its subscriber data usage, either based on specific data rates or by apportionment agreement). In still other embodiments, the unique network architecture allows individual MNOs to negotiate different data delivery speeds (bandwidth rates) (which may be separate data rates for each different MNO) and/or also allows for (but does not require) different authentication or security standards to be used for each member MNO. Alternative examples of the above may include carrier negotiated direct connection rates for 3G/4G data offload to the neutral host network based on a pay per usage rate. In other examples, the herein described networks allow for negotiated MNO-venue agreements to specify authentication types such as standard 3GPP protocols and 2-way SLA. Still furthermore, individual MNO SLA monitoring and/or metering is possible with the herein described network architecture.

In certain example embodiments, a neutral host network is provided which "seamlessly" connects, authenticates and routes data from a subscriber's WiFi enabled device (e.g., a smartphone handset) to a mobile carrier (MNO), despite the connected presence of other MNOs and/or the connection of differently subscribed WiFi devices. "Seamless" as used herein means that a WiFi enabled device user can connect to the neutral host network without being required to participate in connection, authentication, and/or routing steps which are not familiar to the subscriber and/or which are not desired by (or selected by) the MNO. In certain preferred embodiments, for example, the manner and/or steps of connecting, authenticating, and/or routing may be tailored, as desired, by the MNO.

In certain example embodiments (alone or in combination with any of the other embodiments described herein), rules triggering cellular data offloading can either be set by an end-user (i.e., a WiFi device subscriber) or, in the alternative, by the subscriber's contracted MNO. Software code (or hardwired circuits) specifying the rules may, for example, reside in an end user's WiFi enabled device, in a network or MNO server, or may reside in combinations of such locations. In some embodiments, end users may set offloading rules based on a desire to exercise data usage cost control. End users may also choose or set rules due to availability of higher bandwidth on non-cellular networks. In such or other embodiments, MNOs may set or implement data offload rules or triggers to prevent or ameliorate congestion of cellular networks.

In at least one example network embodiment, a multi-tenant exchange platform is installed at or proximal a hub of a venue network access solution. In such an embodiment, the exchange platform aggregates traffic from installed Wi-Fi access points, and authenticates, meters, and routes data traffic to the internet or to local content or advertising providers, distributors, or cellular partners. In such an embodiment, a plurality of MNO subscribers (subscribed with different MNOs) may be served simultaneously, while also implementing each MNO's specific (often different) authentication and traffic routing policies. In such an embodiment, Wi-Fi offload or connection sessions are rapidly directed to their desired locations. In conjunction with such example networks, optical fiber distributed antenna systems ("DAS") may be employed to enhance network functionality and/or performance. For example, multi-sector antenna, high user density, DAS solutions may be utilized to provide enhanced, dependable access coverage within buildings, campuses, and venues while providing support for commercial wireless, public safety radio, private 2-way radio, and paging. In certain embodiments which employ fiber multiplexing solutions, capital and operating expenditures may also be reduced.

In preferred (but not all) embodiments of the networks described herein, the venue WiFi access system is WiFi vendor neutral. In such embodiments, the access system interoperates seamlessly with existing and new WiFi system providers, and connects to mobile operators via standard interfaces. Connection, in these example embodiments, may take place either directly or via intermediary service provider(s) such as for authentication, authorization, and user traffic routing.

Certain examples of the invention are now described below with respect to certain non-limiting embodiments thereof as illustrated in the following drawings wherein:

BRIEF DESCRIPTION OF CERTAIN EXAMPLE DRAWINGS

The drawings submitted with and which form a part of this patent application each illustrate an embodiment, or one or more components of an embodiment, of a non-limiting example of Applicant's invention. While these drawings depict certain preferred embodiments of Applicant's invention, as well as certain particularly desirable features thereof, they are intended to be examples only and should not be construed to limit the scope of Applicant's invention.

Figure 3:
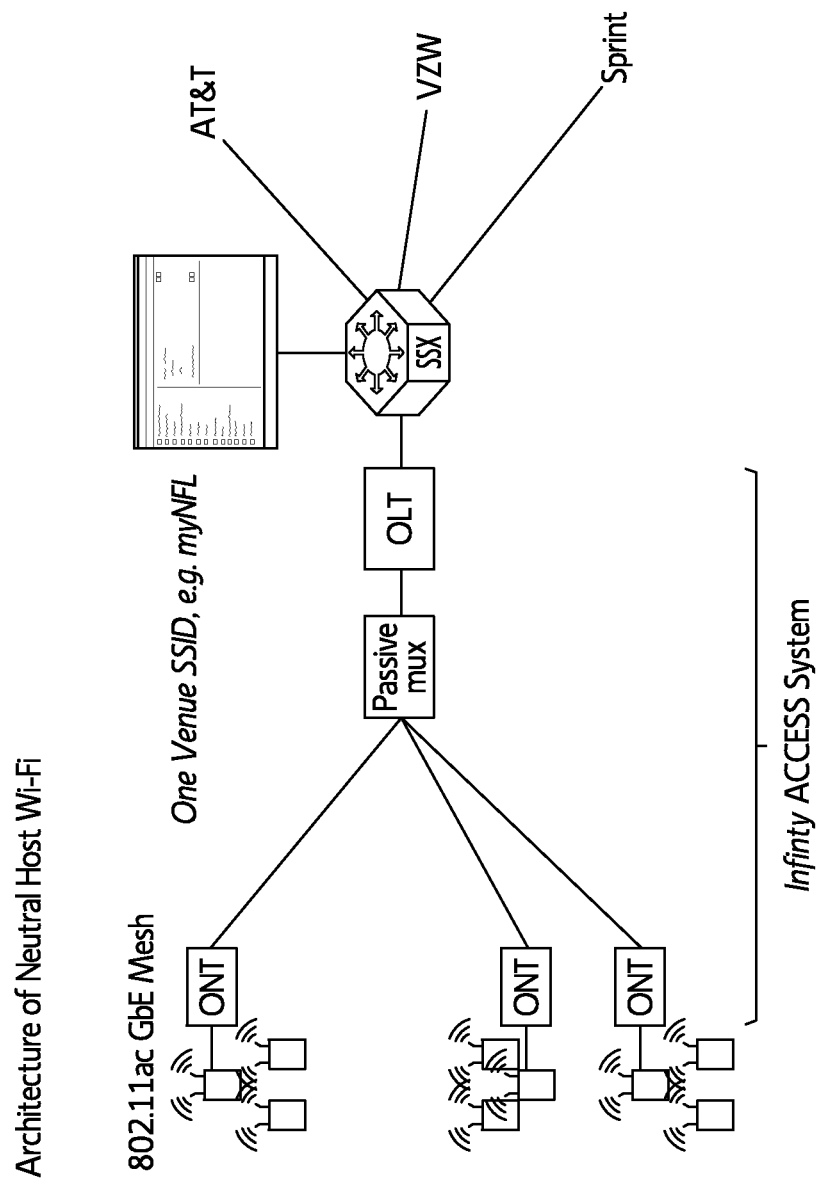

FIG. 3. illustrates a further alternative embodiment of a neutral host WiFi architecture according to the subject invention. More specifically, this figure illustrates a non-limiting example architecture of a neutral host WiFi platform comprising access points; a DWDM passive optical network fiber; an AC power distribution infrastructure to provide power to the ONT and access points; a controller-less smart signaling switch router (a controller for the access points may be optionally used) that allows direct connect to service providers such as, for example, ATT, Sprint, and Verizon Wireless; and a venue SSID.

Figure 4:
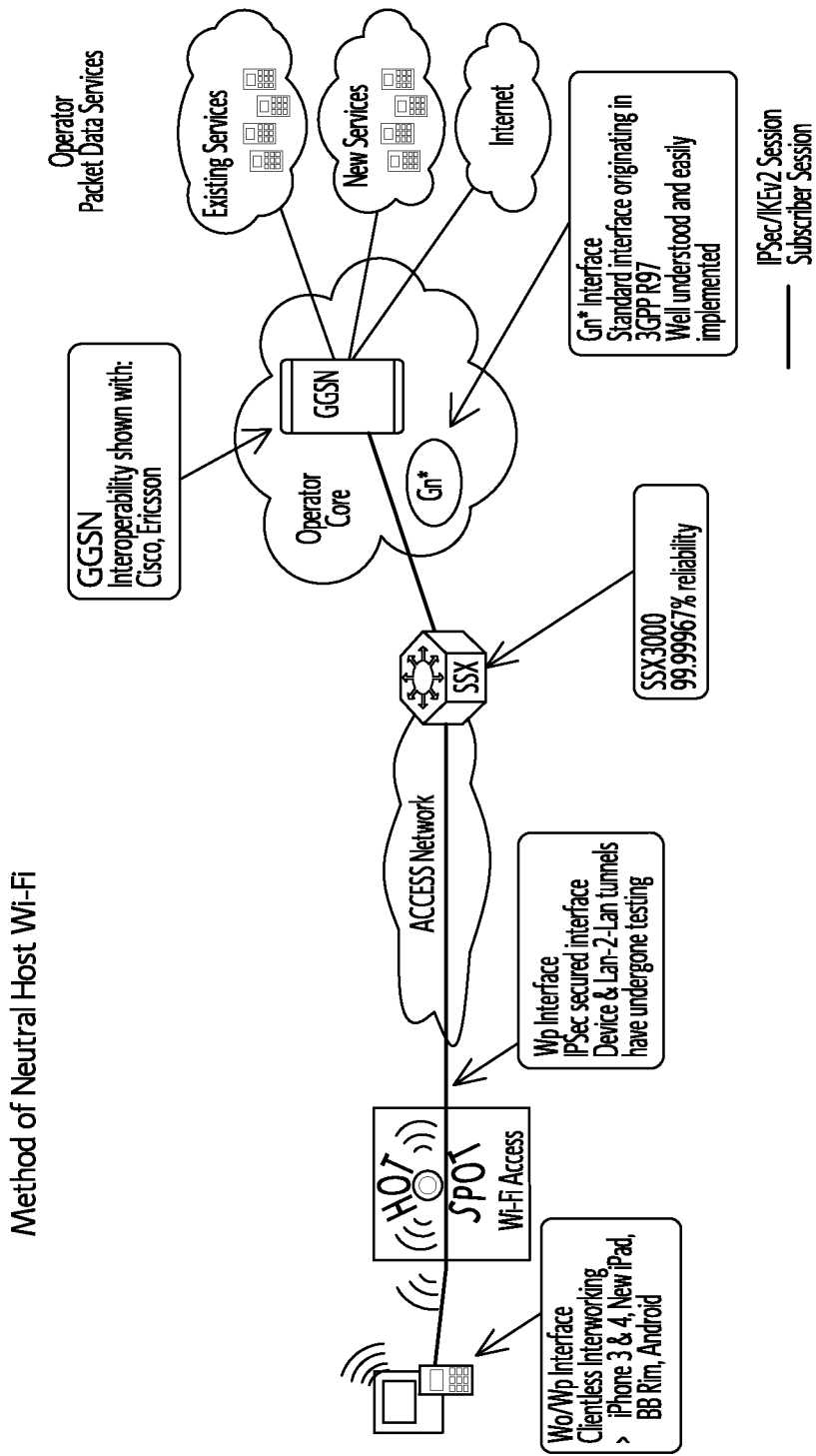

FIG. 4 illustrates one embodiment of a method and/or neutral host network which includes or uses an IPSec tunnel provisioned for a 3G handset, and in which additional data services are being provided as data in addition to the internet. More specifically, this figure illustrates a non-limiting example terminating IPSec Tunnel for a 3G Handset and/or a method or network providing neutral host WiFi for a 3G handset comprising subscribers who consume bi-directional bandwidth of internet based streaming of audio, video, and data; an owner that has built the neutral host WiFi platform based on the described architecture; an architecture that delivers the internet based streams between a subscriber and a carrier; and an operator that provides the internet based streams to their specific subscribers only and connects directly with the neutral host platform without going through a 'middle man' ISP.

Figure 5:
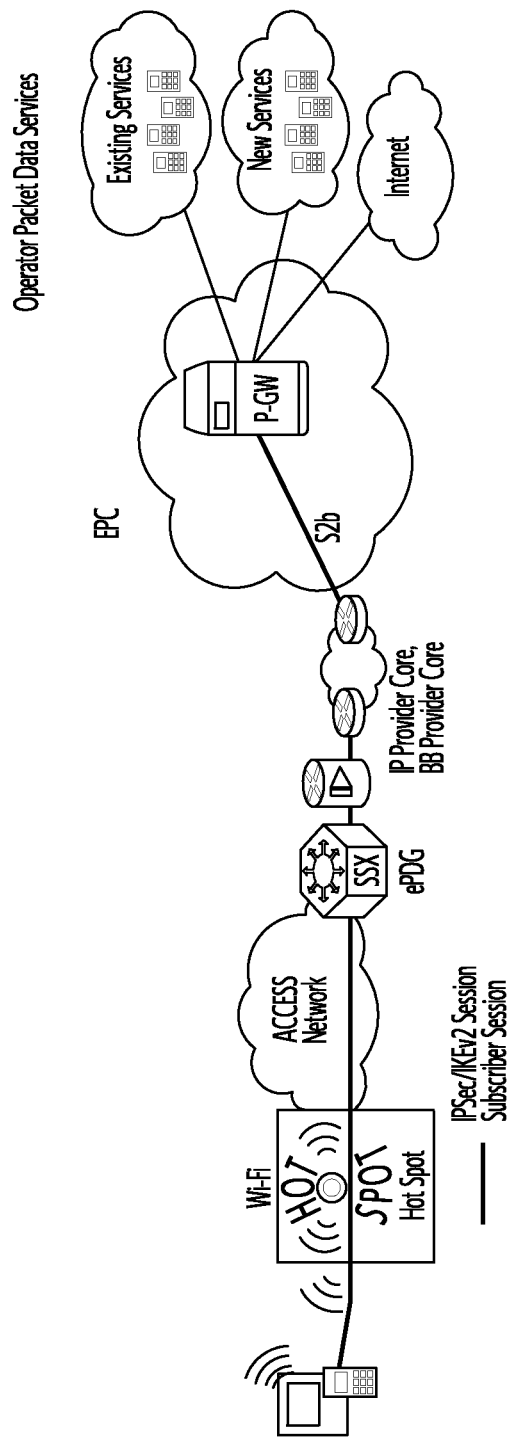

FIG. 5 illustrates one embodiment of a method and/or neutral host network which includes or uses a terminating packet data gateway for a 4G handset, and in which additional data services are being provided as data in addition to the internet. More specifically, this figure illustrates a non-limiting example terminating packet data gateway for a 4G handset and/or a method or network providing neutral host WiFi for a 4G handset comprising subscribers who consume bi-directional bandwidth of internet based streaming of audio, video, and data; an owner that has built the neutral host WiFi platform based on the described architecture; an architecture that delivers the internet based streams between a subscriber and a carrier; and an operator that provides the internet based streams to their specific subscribers only and connects directly with the neutral host platform without going through a 'middle man' ISP.

Figure 6:
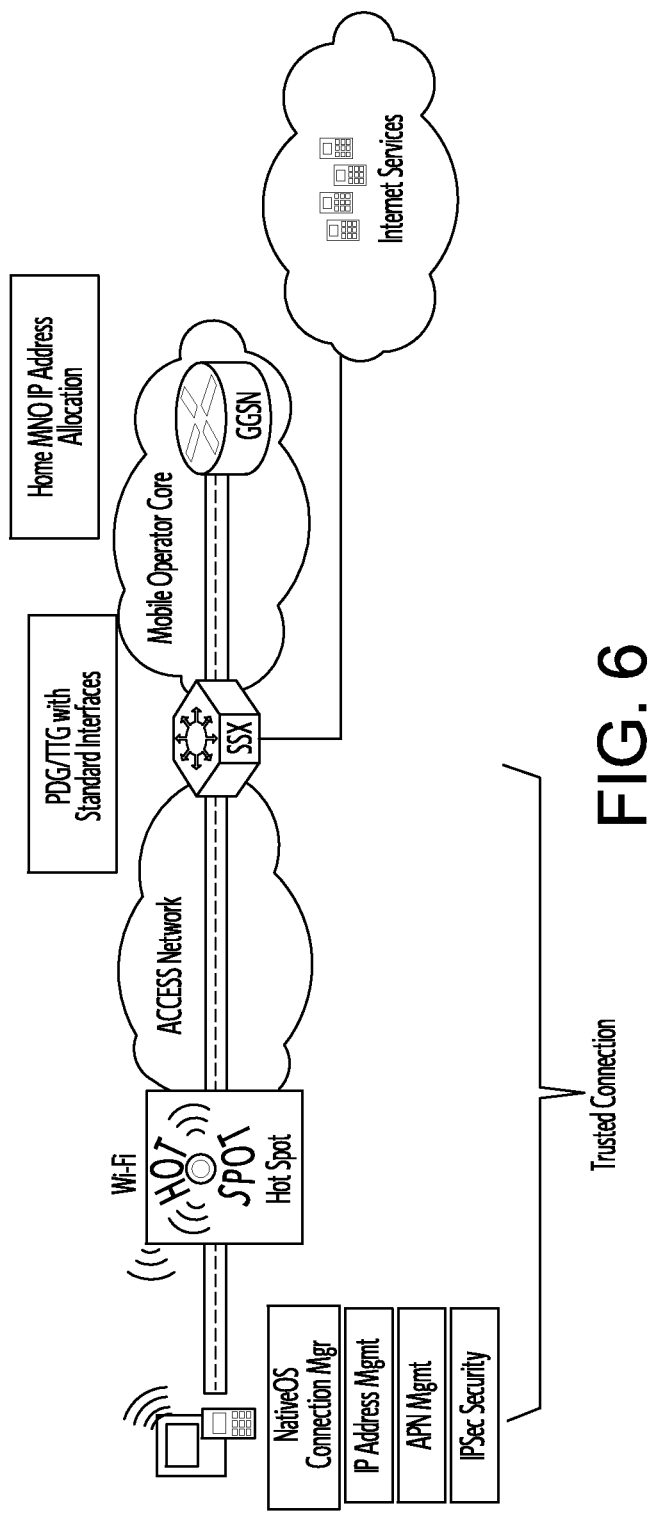

FIG. 6 illustrates one embodiment of a method and/or neutral host network which includes or uses an IPSec tunnel and includes by-pass of internet traffic to an Internet Service Provider (ISP). More specifically, this figure illustrates a non-limiting example terminating IP Sec Tunnel with by-pass of internet traffic to Internet Service Provider and/or a method or network providing neutral host WiFi for a WiFi enabled handset comprising subscribers who consume bi-directional bandwidth of internet based streaming of audio, video, and data; an owner that has built the neutral host WiFi platform based on the described architecture; an architecture that delivers the internet based streams between a subscriber and a carrier; and an operator that provides the internet based streams to their specific subscribers only and connects directly with the neutral host platform without going through a 'middle man' ISP.

Figure 7:
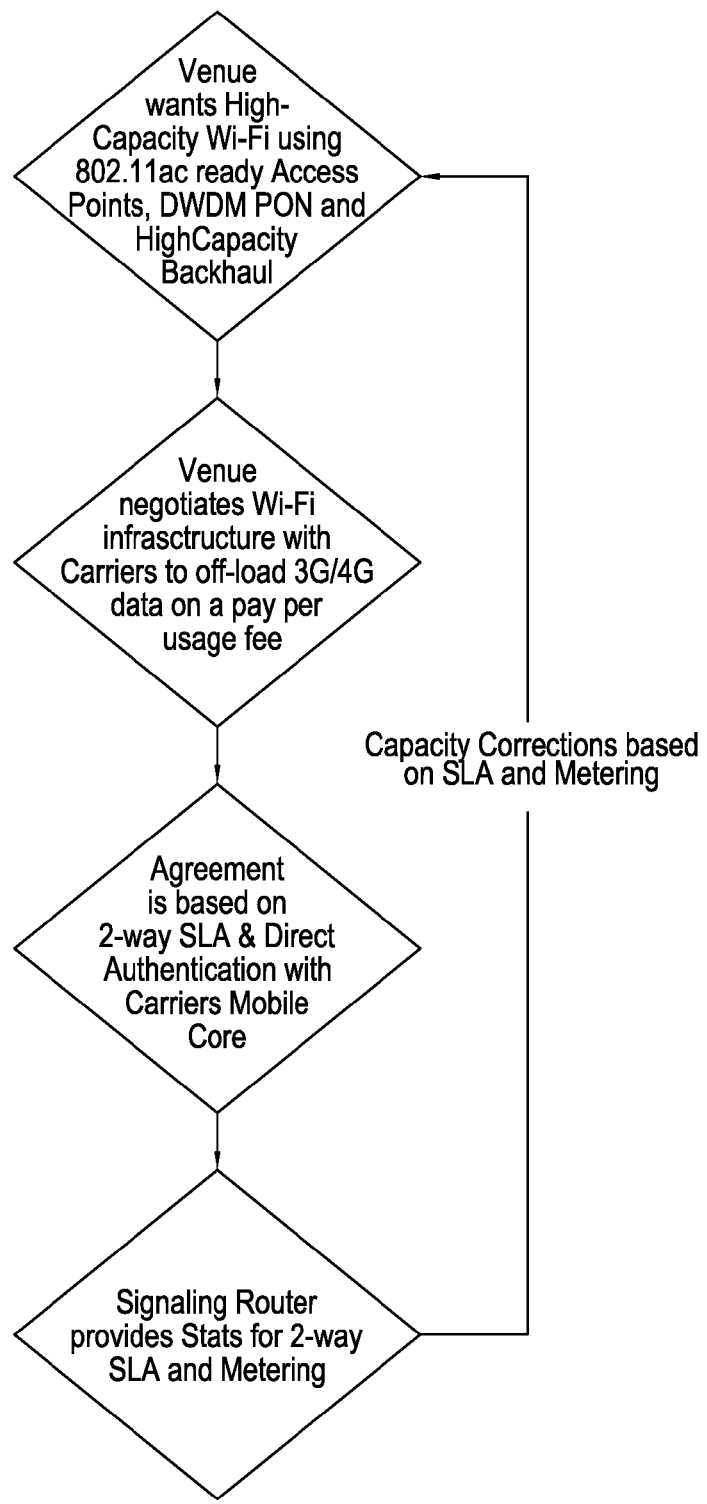

FIG. 7 illustrates one embodiment of a method and/or neutral host network, including example business processes involved therewith. More specifically, this figure illustrates a non-limiting example business process involved in building a neutral host WiFi model comprising and/or including a venue owned high capacity WiFi infrastructure; carrier negotiated direct connection for 3G/4G data off-load to WiFi infrastructure on a pay per usage fee basis; a carrier-venue agreement to provide authentication using standard 3GPP protocols and a 2-way SLA; an SLA of direct connection and SLA metering; and periodic adjustment to infrastructure to keep up with SLA.

DESCRIPTION OF CERTAIN NON-LIMITING EXAMPLE EMBODIMENTS

For a more complete understanding of the present invention, reference is now made to the following description of various illustrative and non-limiting embodiments thereof, taken in conjunction with the accompanying drawings in which like reference numbers indicate like features.

Broadly speaking, an example carrier-grade cellular off-load WiFi network infrastructure, considered part of and useful with the numerous inventions described herein, includes a plurality of WiFi access points placed at desired locations throughout a venue, such as a sports stadium. The access points are connected with a common wireless LAN controller located, for example, in a telecommunications room within the venue. The infrastructure connecting the access points to the telecommunications room, in this particular example, is a passive optical local area network (LAN) with point to multi-point links comprised of armored single mode (SM) fiber connections. The single SM fiber terminates at the head-end, at a connection to active electronic optical line termination (OLT) equipment. The OLT, in this example, is in turn connected with copper transmitters/receivers to active ethernet switch and WLAN controller components which all also reside in the telecommunications room (other locations may, of course, be employed). On the multi-point side, the single fiber 'drops' preferably all connect to individual optical termination terminals (ONTs). The ONTs, in turn, are each preferably connected to the provided WiFi access points with copper transmitter/receivers.

In this example architecture, a plurality of MNOs bring their own fiber connections to the telecommunications room, and connect directly with the wireless LAN controller though optical transmitters/receivers. In this manner, by operation of the network configuration and set-up (including, for example, controller software and/or hardware), such plurality of MNOs can insert individual data streams destined for their specific contracted subscribers (i.e., data streams may be routed/managed in a manner to only reach devices subscribed to a particular MNO). Similarly, data transmitted from mobile device users can be managed or directed so that it is transmitted solely to the contracted MNO of the device user. Moreover, in this example embodiment, both the WiFi access points and the WLAN controller are able to regulate traffic, and provide statistics pertaining to data traffic and usage, such as for the implementation or maintenance of a service level agreement between the venue owner and participating MNOs.

Figure 1:
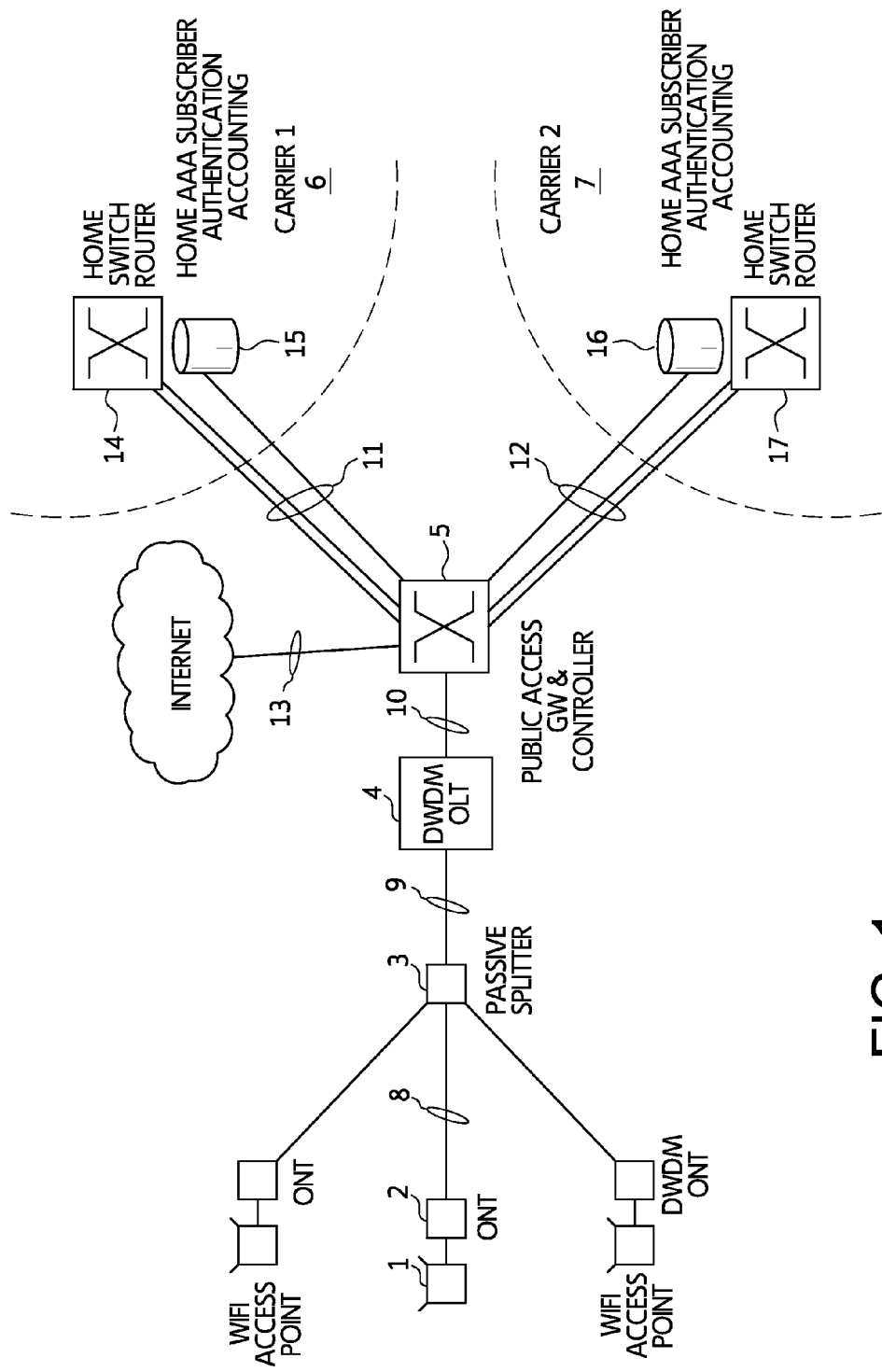
FIG. 1 illustrates one embodiment of a neutral host WiFi architecture according to the subject invention.

Turning now to FIG. 1, a more specific but still non-limiting example of an inventive WiFi offload network is depicted in this figure. FIG. 1, in this regard, illustrates a network employing a neutral common wireless LAN controller at its core, with both 3GPP 3G PDG/TTG and 4G EPC authentication protocols being provided for UMTS devices and LTE devices, respectively. More specifically, WiFi access point 1 is connected to Public Access Gateway & Controller 5 (i.e., a neutral common wireless LAN controller) transparently through a DWDM passive optical network "PON" (which includes ONT 2, passive splitter 3, and DWDM OLT 4). Further wireless access points may, of course, be provided (such as illustrated) to scale up the coverage of the WiFi network to accommodate specific venue attendance or use expectations. WiFi access point 1 is directly connected to ONT 2 with a short CAT5/CAT6 connection. In this example, both the access point and the ONT are co-located within the venue. ONT 2 is connected, in turn, by fiber 8 to a passive splitter 3 which itself is connected by fiber 9 to DWDM OLT 4. The DWDM OLT connects with Public Access Gateway & Controller 5 via short CAT5/CAT6 connections. DWDM OLT 4 is preferably co-located with Public Access Gateway & Controller 5. The participating carriers, or MNOs, connect directly to Public Access Gateway and Controller 5 (e.g., preferably with fiber). Utilizing a network architecture as depicted in FIG. 1, increased broadband throughput for subscribers may be obtained (which also benefits the venue owner for one or more of the numerous reasons described herein). Additionally, the example passive optical network depicted provides the venue with form flexibility and improved and/or tailorable labor economics compared to prior art networks and offloading methods, when increasing the density of access points in a venue. Preferably, using this network architecture, downloads of software clients onto user's WiFi devices is not required to join or use the network.

Figure 2:
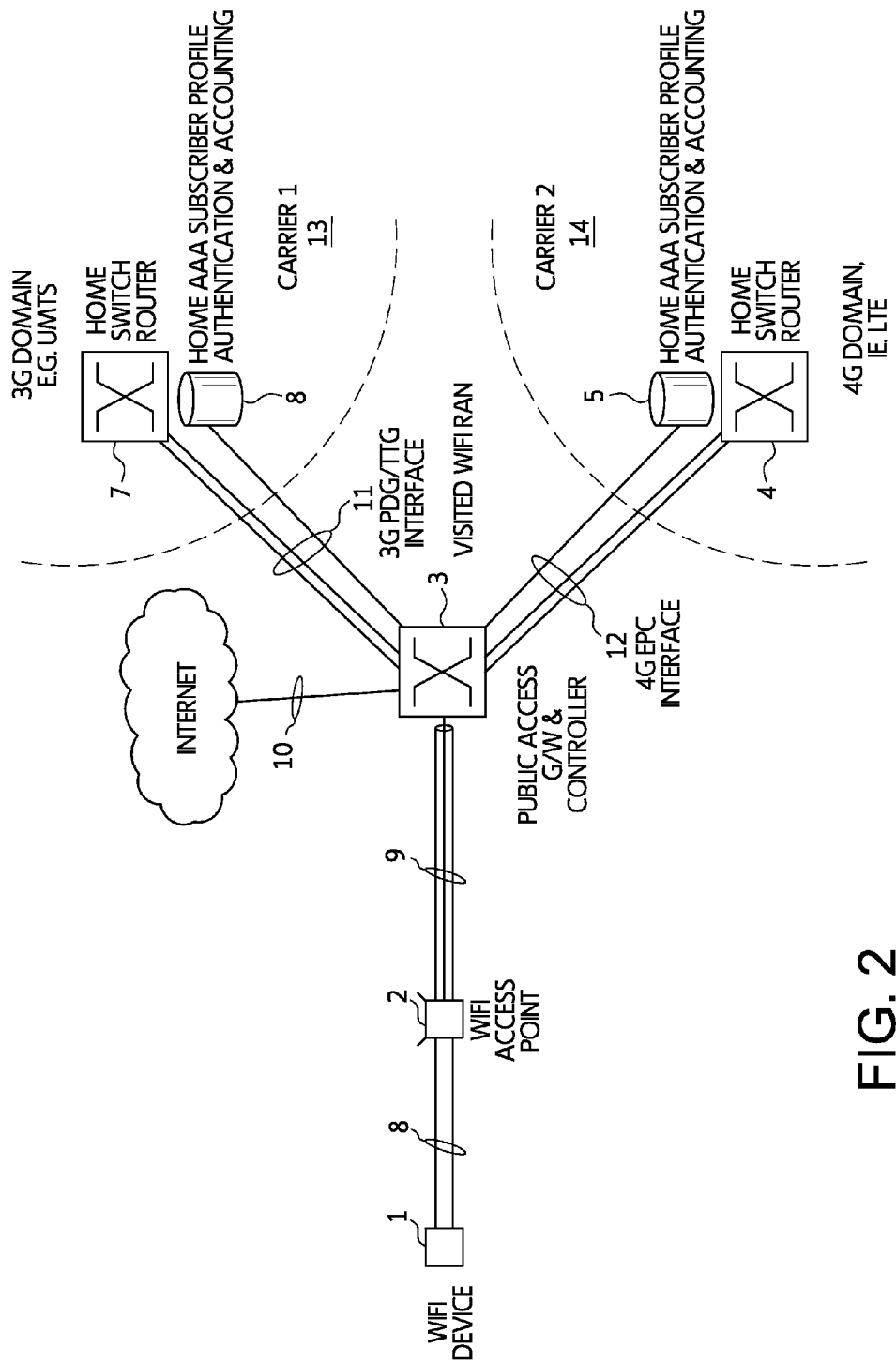
FIG. 2 illustrates an alternative embodiment of a WiFi architecture where alternative types of authentication protocols are implemented.

In another, different manner of operating or designing a network to increase revenue while reducing infrastructure costs (which also implements security), such as shown in FIG. 2, protected or secured connections between WiFi devices (e.g., a cellular handset 1) and Public Access Gateway & Controller 3 are employed. In this example, once WiFi device 1 acquires a local IP address, Public Access Gateway & Controller 3 initiates secure connections 8 and 9 to the WiFi device. These secure connections are virtual private network (VPN) connections based on IPSec security protocols. Once these VPNs are established, Public Access Gateway & Controller 3 can initiate authentication via an EAP-SIM protocol which provides the SIM card identification ("ID") of WiFi device 1 (or of other devices initiating connection). Also in this example, authentication is either with a 3GPP 3G PDG/TTG or 4G EPC protocol (other protocols whether or not currently known may, of course, be employed). In addition to other benefits, this example architecture provides flexibility to each MNO with respect to device user traffic. If an MNO does not want a particular subscriber's data traffic, for example, this may be set as a policy, such as, for example, in home server AAA 5 or 6 of the carrier (MNO). Such a policy would be communicated to Public Access Gateway & Controller 3, which would then divert the particular user's traffic to local Internet connection 10.

In this or in any of the other examples described or disclosed herein, the gateway controller (e.g., a neutral common controller) is capable of tracking session data for MNOs or for the venue owner.

While each of the above-described network configurations and their components are excellent for their intended purposes, they are not each required to be utilized or employed as exactly described or otherwise depicted. For example, one or more component(s) may be reconfigured or replaced or repositioned or eliminated without departing from the scope of the invention.

The following is a list of example features and benefits that the herein-described invention provides. While certain embodiments of the invention provide all of these features, other embodiments may only provide one of these features (or benefits) or some smaller combination of such features and benefits (or even none of these benefits, with other advantages being recognized or provided by the disclosed inventions, even though not expressly identified herein):

Non-Limiting Example Summary of Certain Features and Benefits

Enhanced branding through improved WiFi device performance.
Attraction of greater, more consistent attendance at venues and events by delivering improved event experiences for attendees.
Visibility of online activities of mobile device users at venues, such visibility providing insights to enable venue owners/operators to create compelling, competitive new services.
Enablement of delivery of improved fan experiences that meet the goals of sports league governing bodies.
Reduction of internet connectivity installation and/or maintenance costs for venue owners/operators as a result of cost sharing or shifting arrangements with participating network operators or members (e.g., MNOs).
Enriched capabilities and new configuration options allow venue owners/operators to work with MNOs to rapidly test new and different business models for specific environments (while still providing an enhanced quality of service to existing customers).
MNOs benefit from reduced network installation and/or maintenance costs as a result of multiple MNO member expense participation.
Improved cellular subscriber satisfaction, for subscribers at locations surrounding venues (but not attending the venues), flowing from decreased loads on cellular networks as a result of cellular data offloading by venue participants.
Opportunities to leverage granular authentication, metering, and/or routing capabilities to permit use based charging and/or to permit apportioned expense allocation (e.g., between venue owner and MNO or between multiple MNOs).
Opportunities to leverage turnkey solutions, including ease of deployment, reduced operating expenses, and enhanced brand value.
Seamless WiFi sign-on experiences (for venue attendees), with familiar and consistent service, that do not require day passes or other cumbersome sign-on procedures (although some MNOs may optionally choose to permit these).
Improved mobile broadband experiences unblemished by poor quality streaming video and slow internet response.
Ability to accommodate the increasing desire of venue attendees to have access to multimedia on their mobile devices which complements the live experience of a venue event (such as a sports contest).
In the past, increasing WiFi capacity required replacement or addition of WiFi access points, which necessitated placement of CAT5/CAT6 cable in grounded and bonded metal conduits (when the access points were moved, the conduits would also need to be moved to follow the access points). This was a huge expense for a venue. In contrast, passive optical local area networks use armored SM fiber which can be hung using plastic tacks. Employed in the neutral host networks described herein, low cost movement and addition of access points is achieved. Similarly, as capacity increases, there may be a need to provide 10G connections to an access point. When such a need arose in the past, expensive infrastructure had to be replaced and/or new copper switches added (e.g., because 10G copper runs are much shorter than 1G copper runs). Comparatively, passive optical local area networks do not need infrastructure changes, since a 10G ONT can easily replace a 1G ONT.
Improved returns on investment as a result of infrastructure and SSID sharing among MNOs. In addition to reduced operational or capital expenditures, single SSID use allows for the creation of a strong brand statement for the venue or event.
Elimination of software clients on handsets for connection, authentication, and/or routing eliminates costs and avoids potential data security issues.
Direct connection to MNOs provides advantages to the MNO, including the capability of backhaul requirement monitoring, analysis of data traffic (e.g., to determine whether data is backhauled vs. sent to a local ISP). This, for example, allows the MNO to measure the amount of data traffic passed to an ISP and to therefore provide accurate billing settlements.
Improved analytics which may include measures of traffic types, device types, and/or particular MNO usage such as to aid in service level agreements and billing settlements.

By providing a scalable WiFi network infrastructure which is vendor neutral, expensive equipment upgrades to accommodate new member MNOs are not required.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined:

I claim:

1. A method of offloading data from congested cellular networks at a venue by providing a bi-directional wireless access network which improves WiFi enabled device data connectivity or performance in high data traffic conditions, said method comprising:
   providing a neutral host multi-tenant exchange network installed at a hub of a venue network access solution, said neutral multi-tenant exchange network aggregating data traffic and authenticating, metering, and routing data to and from wireless enabled devices of mobile network operator subscribers and to and from mobile network operators, said neutral multi-tenant exchange network comprising:
   a neutral common wireless local area network controller;
   a plurality of mobile network operators communicably and operatively connected to said neutral common wireless local area network controller;
   a plurality of wireless network access points installed at a venue and a common wireless local area network, including connections to a plurality of mobile network operator subscribers, communicating with said plurality of wireless network access points;
   a dense wavelength division multiplexing passive optical network interposed between and communicably connected to each of said neutral common wireless local area network controller and said plurality of wireless network access points;
   wherein said neutral multi-tenant exchange network is so configured such that different mobile network operators, with different respective subscribers, insert individualized data streams into a same, shared said neutral common wireless local area network controller and said individualized data streams are only delivered to intended wireless enabled devices associated with respective subscribers of said mobile network operators which are inserting respective said individualized data streams; and
   wherein said neutral multi-tenant exchange network is also so configured such that data use by mobile network operator subscribers is offloaded to said neutral host multi-tenant exchange network according to offloading rules selected by said respective plurality of mobile network operators or by respective subscribers of said plurality of mobile network operators.

2. The method according to claim 1 wherein said provided dense wavelength division multiplexing passive optical network comprises an optical network terminal, a passive splitter, and a dense wavelength division multiplexing optical line termination unit.

3. The method according to claim 2 wherein a single SSID is being broadcast and shared amongst a plurality of wireless enabled device user subscribers, each contracted with one of two or more different mobile network operators of said plurality of mobile network operators participating in said neutral host multi-tenant exchange network, wherein said neutral host multi-tenant exchange network is so configured such that each mobile network operator of said plurality of mobile network operators exchanges bi-directional, isolated data streams with only its own contracted wireless enabled device user subscribers.

4. The method according to claim 3 wherein said neutral host multi-tenant exchange network is so configured such that data offload operations are seamless in that mobile network subscribers are connected to said neutral host multi-tenant exchange network in accordance with authentication protocols selected by the mobile network operator of said plurality of mobile network operators affiliated with a particular wireless enabled device subscriber.

5. The method according to claim 4 wherein said neutral host multi-tenant exchange network is so configured such that a plurality of different authentication protocols can be utilized to subscribe to said neutral host multi-tenant exchange network, depending on the selected protocols of different, individual mobile network operators of said plurality of mobile network operators.

6. The method according to claim 5 wherein said neutral host multi-tenant exchange network is so configured to have a neutral host connection structurally designed to be mutually compatible with a plurality of different mobile network operators; and wherein said plurality of mobile network operators can join into said neutral host multi-tenant exchange network by inserting data streams into said neutral common wireless local area network controller as a host connection.

7. The method according to claim 6 wherein said neutral host multi-tenant exchange network is so configured so that said neutral common wireless local area network controller includes software and hardware provisioned so that data traffic, inserted into said neutral host multi-tenant exchange network by individual mobile network operators of said plurality of mobile network operators and received by said individual mobile network operators of said plurality of mobile network operators, from said neutral host multi-tenant exchange network, can be measured, metered, monitored, and/or tailored separate from other data of different mobile network operators of said plurality of mobile network operators.

8. The method according to claim 7 wherein said neutral host multi-tenant exchange network is installed at a venue location and which includes a plurality of mobile network operator participants, and wherein the venue owner derives revenue from mobile network operator participants based upon measured, metered, monitored, and/or tailored data usage or characteristics.

9. The method according to claim 6 wherein said neutral host multi-tenant exchange network includes supplemental data streams, inserted into said neutral host multi-tenant exchange network, for delivery to wireless enabled device subscribers, which are tailored by a venue owner or a mobile network operator to enhance a subscriber attendance experience at a venue.

10. The method according to claim 4 wherein said neutral host multi-tenant exchange network is so configured such that it implements said authentication protocols utilizing data provided by SIM cards installed in wireless enabled devices of mobile network subscribers.

11. A method of offloading data from congested cellular networks at a venue by providing a bi-directional wireless access network which improves WiFi enabled device data connectivity or performance in high data traffic conditions, said method comprising:
  providing a neutral host multi-tenant exchange network installed at a hub of a venue network access solution, said neutral multi-tenant exchange network aggregating data traffic and authenticating, metering, and routing data to and from wireless enabled devices of mobile network operator subscribers and to and from mobile network operators, said neutral multi-tenant exchange network comprising:
  a neutral common wireless local area network controller;
  a plurality of mobile network operators communicably and operatively connected to said neutral common wireless local area network controller;
  a plurality of wireless network access points installed at a venue and a common wireless local area network, including connections to a plurality of mobile network operator subscribers, communicating with said plurality of wireless network access points;
  a dense wavelength division multiplexing passive optical network interposed between and communicably connected to each of said neutral common wireless local area network controller and said plurality of wireless network access points;
  wherein said neutral multi-tenant exchange network is so configured such that different mobile network operators, with different respective subscribers, insert individualized data streams into a same, shared said neutral common wireless local area network controller and said individualized data streams are only delivered to intended wireless enabled devices associated with respective subscribers of said mobile network operators which are inserting respective said individualized data streams;
  wherein said neutral multi-tenant exchange network is also so configured such that data use by mobile network operator subscribers is offloaded to said neutral host multi-tenant exchange network according to offloading rules selected by said respective plurality of mobile network operators or by respective subscribers of said plurality of mobile network operators;
  wherein a single SSID is being broadcast and shared amongst a plurality of wireless enabled device user subscribers, each contracted with one of two or more different mobile network operators of said plurality of mobile network operators participating in said neutral host multi-tenant exchange network, wherein said neutral host multi-tenant exchange network is so configured such that each mobile network operator of said plurality of mobile network operators exchanges bi-directional, isolated data streams with only its own contracted wireless enabled device user subscribers; and
  wherein said neutral host multi-tenant exchange network is so configured such that data offload operations are seamless in that mobile network subscribers are connected to said neutral host multi-tenant exchange network in accordance with authentication protocols selected by the mobile network operator affiliated with a particular mobile device subscriber.

12. The method according to claim 11 wherein said neutral host multi-tenant exchange network is so configured to have a neutral host connection structurally designed to be mutually compatible with a plurality of different mobile network operators; and wherein said plurality of mobile network operators can join into said neutral host multi-tenant exchange network by inserting data streams into said neutral common wireless local area network controller as a host connection.

13. The method according to claim 11 wherein said neutral host multi-tenant exchange network is so configured such that it implements said authentication protocols utilizing data provided by SIM cards installed in wireless enabled devices of mobile network subscribers.

14. The method of offloading data from congested cellular networks at a venue by providing a bi-directional wireless access network which improves WiFi enabled device data connectivity or performance in high data traffic conditions, said method comprising:
  providing a neutral host multi-tenant exchange network installed at a hub of a venue network access solution, said neutral multi-tenant exchange network aggregating data traffic and authenticating, metering, and routing data to and from wireless enabled devices of mobile network operator subscribers and to and from mobile network operators, said neutral multi-tenant exchange network comprising:
  a neutral common wireless local area network controller;
  a plurality of mobile network operators communicably and operatively connected to said neutral common wireless local area network controller;
  a plurality of wireless network access points installed at a venue and a common wireless local area network, including connections to a plurality of mobile network operator subscribers, communicating with said plurality of wireless network access points;
  a dense wavelength division multiplexing passive optical network interposed between and communicably connected to each of said neutral common wireless local area network controller and said plurality of wireless network access points;
  wherein said neutral multi-tenant exchange network is so configured such that different mobile network operators, with different respective subscribers, insert individualized data streams into a same, shared said neutral common wireless local area network controller and said individualized data streams are only delivered to intended wireless enabled devices associated with respective subscribers of said mobile network operators which are inserting respective said individualized data streams; and
  wherein said neutral multi-tenant exchange network is also so configured such that data use by mobile network operator subscribers is offloaded to said neutral host multi-tenant exchange network according to offloading rules selected by said respective plurality of mobile network operators or by respective subscribers of said plurality of mobile network operators;
  wherein a single SSID is being broadcast and shared amongst a plurality of wireless enabled device user subscribers, each contracted with one of two or more different mobile network operators of said plurality of mobile network operators participating in said neutral host multi-tenant exchange network, wherein said neutral host multi-tenant exchange network is so configured such that each mobile network operator of said plurality of mobile network operators exchanges bi-directional, isolated data streams with only its own contracted wireless enabled device user subscribers;
  wherein said neutral host multi-tenant exchange network is so configured such that data offload operations are seamless in that mobile network subscribers are connected to said neutral host multi-tenant exchange network in accordance with authentication protocols selected by the mobile network operator affiliated with a particular mobile device subscriber; and wherein said neutral host multi-tenant exchange network includes supplemental data streams, inserted into said neutral host multi-tenant exchange network, for delivery to wireless enabled device subscribers, which are tailored by a venue owner or a mobile network operator to enhance a subscriber attendance experience at a venue.

15. The method according to claim 14 wherein said neutral host multi-tenant exchange network is so configured to have a neutral host connection structurally designed to be mutually compatible with a plurality of different mobile network operators; and wherein said plurality of mobile network operators can join into said neutral host multi-tenant exchange network by inserting data streams into said neutral common wireless local area network controller as a host connection.

* * * * *